United States Patent
Kim et al.

(10) Patent No.: US 10,690,237 B2
(45) Date of Patent: Jun. 23, 2020

(54) VEHICLE PARKING SYSTEM AND METHOD OF CONTROLLING THE SAME

(71) Applicants: Hyundai Motor Company, Seoul (KR); Kia Motors Corporation, Seoul (KR)

(72) Inventors: Bum Jun Kim, Bucheon-si (KR); Yong Ik Kim, Hanam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 281 days.

(21) Appl. No.: 15/901,648

(22) Filed: Feb. 21, 2018

(65) Prior Publication Data

US 2019/0128406 A1 May 2, 2019

(30) Foreign Application Priority Data

Nov. 1, 2017 (KR) .................. 10-2017-0144792

(51) Int. Cl.
*F16H 59/54* (2006.01)
*F16H 61/00* (2006.01)
*F16H 59/74* (2006.01)
*F16H 61/22* (2006.01)

(52) U.S. Cl.
CPC ......... *F16H 61/0021* (2013.01); *F16H 59/74* (2013.01); *F16H 61/22* (2013.01); *F16H 59/54* (2013.01); *F16H 2059/746* (2013.01); *F16H 2061/223* (2013.01); *F16H 2312/12* (2013.01)

(58) Field of Classification Search
CPC ...... F16H 61/0021; F16H 61/22; F16H 59/74; F16H 2061/223; F16H 2059/746; F16H 2312/12; F16H 59/54
See application file for complete search history.

(56) References Cited

U.S. PATENT DOCUMENTS

| | | | | |
|---|---|---|---|---|
| 4,955,935 A * | 9/1990 | Katayama | ............. | B60K 20/06 192/220.2 |
| 6,659,255 B2 * | 12/2003 | Syamoto | ................ | F16H 61/22 192/220.4 |
| 2004/0195071 A1 * | 10/2004 | Khaykin | ................ | F16H 61/22 192/220.2 |
| 2010/0274414 A1 * | 10/2010 | Park | ..................... | B60W 30/06 701/2 |
| 2012/0232765 A1 * | 9/2012 | Holub | .................... | B60R 25/08 701/66 |

(Continued)

FOREIGN PATENT DOCUMENTS

KR 1019960021718 A 7/1996

*Primary Examiner* — David R Morris
*Assistant Examiner* — Lillian T Nguyen
(74) *Attorney, Agent, or Firm* — Slater Matsil, LLP

(57) ABSTRACT

Disclosed herein is a method of controlling a system for neutral range parking of a vehicle. The power of the vehicle is turned off based on operation of a start button when a shift range of a vehicle transmission is a P-range. It is determined whether a brake pedal is operated after the power is turned off and, when the brake pedal is determined to be operated after the power is turned off, an automatic lever solenoid valve of the transmission is operated to allow the transmission to shift from the P-range to another shift range by releasing engagement between the automatic lever solenoid valve and an engaging lever.

20 Claims, 2 Drawing Sheets

(56) References Cited

U.S. PATENT DOCUMENTS

| | | | |
|---|---|---|---|
| 2015/0316143 A1* | 11/2015 | Deurloo | F16H 63/3483 192/219.4 |
| 2016/0201633 A1* | 7/2016 | Quinteros | F02N 11/0822 477/111 |
| 2017/0129465 A1* | 5/2017 | Ozawa | B60T 1/005 |

* cited by examiner

VEHICLE PARKING SYSTEM AND METHOD OF CONTROLLING THE SAME

CROSS-REFERENCE TO RELATED APPLICATIONS

This application claims priority to Korean Patent Application No. 10-2017-0144792, filed on Nov. 1, 2017, which application is hereby incorporated herein by reference.

TECHNICAL FIELD

The present invention relates to a vehicle parking system and a method of controlling the same.

BACKGROUND

A vehicle is typically parked after the shift range of its transmission is set as a P-range and its parking brake is operated. However, in so-called double parking in which a vehicle is parked in front of the other parked vehicle due to the lack of parking space, the vehicle is parked after its transmission is set to be in an N-range and its parking brake is released in order to push and move the double-parked vehicle to move the vehicle parked inside the same.

In recent years, a vehicle generally has a start button or a smart key. If the vehicle is stopped in an N-range state, the door of the vehicle may not be locked because the vehicle is in an ACC mode and the power thereof is not turned off. To resolve this issue, a shift lock release button is provided adjacent to a shift lever. Accordingly, when the shift lever is set to be an N-range in the state in which the shift lock release button is pressed after the engine of the vehicle is turned off in a P-range, the power of the vehicle is turned off to enable the door to be locked.

However, since a driver must use both hands when operating the shift lever from the P-range to the N-range for parking in such a case, there is a risk of releasing a steering wheel from the hands. The operation of the shift lock release button is inconvenient since the shift lock release button is very small and since the shift lock release button has to be maintained until the lever is shifted in the state in which the shift lock release button is pressed. In addition, it is disadvantageous in terms of cost, weight and layout since a separate shift lock release structure has to be installed to the lever and a button has to be installed on the upper surface of a console.

The foregoing is intended merely to aid in the understanding of the background of the present invention, and is not intended to mean that the present invention falls within the purview of the related art that is already known to those skilled in the art.

SUMMARY

The present invention relates to a vehicle parking system and a method of controlling the same, and, in particular embodiments, to a system for neutral range parking of a vehicle, which enables the shift range of a vehicle to be set as an N-range in a state in which the engine of the vehicle is turned off during double parking.

The present invention has been made keeping in mind the above problems occurring in the related art and embodiments propose a system for neutral range parking of a vehicle, which enables operation from a P-range to an N-range with convenience while having a simple structure. A method of controlling is also proposed.

In accordance with one aspect of the present invention, a method of controlling a system for neutral range parking of a vehicle includes turning off power by operating a start button in a state in which a shift range of a vehicle transmission is a P-range. It is determined whether a brake pedal is operated by a controller after the power is turned off in the turning off power. An automatic lever solenoid valve of the transmission is operated by the controller. When the brake pedal is determined to be operated in the determining whether a brake pedal is operated, the transmission is allowed to shift from the P-range to another shift range by a releasing engagement between the automatic lever solenoid valve and an engaging lever when the shift range is changed to the P-range in the turning off power.

The method may further include sending a message saying "Please operate brake pedal if you want to shift from P-range to another shift range" or the like to a cluster by the controller, when the power is turned off in the turning off power.

The controller may determine whether a signal indicative of the operation of the brake pedal is input to the controller within a predetermined reference time pre-input to the controller.

The method may further include determining whether an elapsed time after the power is turned off in the turning off power exceeds a predetermined reference time pre-input to the controller by the controller, when a signal indicative of the operation of the brake pedal is not input to the controller in the determining whether a brake pedal is operated.

When the elapsed time after the power is turned off in the turning off power is determined to exceed the predetermined reference time pre-input to the controller in the determining whether an elapsed time after the power is turned off in the turning off power exceeds a predetermined reference time, the controller may maintain a power-off state so as not to perform gear-shifting any more.

The method may further include sending a message saying "Please operate brake pedal if you want to shift from P-range to another shift range" or the like to a cluster by the controller, when it is determined that the elapsed time after the power is turned off in the turning off power does not exceed the predetermined reference time pre-input to the controller in the determining whether an elapsed time after the power is turned off in the turning off power exceeds a predetermined reference time.

The method may further include determining whether the shifting from the P-range to another shift range is completely performed by the controller by operating an automatic lever solenoid valve of the transmission, when a signal indicative of the operation of the brake pedal is input to the controller in the determining whether a brake pedal is operated.

The method may further include determining whether an elapsed time after the power is turned off in the turning off power exceeds a predetermined reference time pre-input to the controller by the controller, when it is determined that the shifting from the P-range to another shift range is not performed in the determining whether the shifting from the P-range to another shift range is completely performed.

When the elapsed time after the power is turned off in the turning off power is determined to exceed the predetermined reference time pre-input to the controller in the determining whether an elapsed time after the power is turned off in the turning off power exceeds a predetermined reference time, the controller may maintain a power-off state so as not to perform gear-shifting any more.

The method may further include sending a message saying "Please operate brake pedal if you want to shift from P-range to another shift range" or the like to a cluster by the controller, when it is determined that the elapsed time after the power is turned off in the turning off power does not exceed the predetermined reference time pre-input to the controller in the determining whether an elapsed time after the power is turned off in the turning off power exceeds a predetermined reference time.

When it is determined that the shifting from the P-range to another shift range is completely performed in the determining whether the shifting from the P-range to another shift range is completely performed, the controller may turn off the power and terminate the control.

The controller may control the shift range to shift only to an N-range in shifting from the P-range to another shift range by the operation of the automatic lever solenoid valve in the operating an automatic lever solenoid valve.

The controller may control a door to be lockable even when the shifting from the P-range to another shift range is performed in the operating an automatic lever solenoid valve.

Since the automatic lever solenoid valve is electrically connected to a B+ terminal of a battery, the controller may determine whether a signal indicative of the operation of the brake pedal is input to the controller within a predetermined reference time pre-input to the controller even after the power is turned off in the turning off power, thereby performing the operating an automatic lever solenoid valve.

In accordance with another aspect of the present invention, a system for neutral range parking of a vehicle is used to perform the method of controlling a system for neutral range parking of a vehicle according to the above aspect, and includes a battery configured to supply power to a vehicle, a start button connected to the battery to turn on/off an engine of the vehicle, a brake pedal provided for deceleration or stop of the vehicle, a transmission configured to shift gears by operation of a shift lever, an automatic lever solenoid valve electrically connected to a B+ terminal of the battery while being installed in the transmission and operated, when the brake pedal is operated in a power-off state, to allow for shifting to a shift range other than a P-range by releasing engagement with an engaging lever, and a controller configured to control the battery, the start button, the brake pedal, the transmission, and the automatic lever solenoid valve.

The controller may send a message saying "Please operate brake pedal if you want to shift from P-range to another shift range" or the like to a cluster when the power is turned off.

As apparent from the above description, in accordance with the system for neutral range parking of a vehicle having the above-mentioned structure and the method of controlling the same, it is possible to reduce the cost, weight, and size of the system, increase the degree of freedom of layout, improve workability in the assembly process, and prevent the occurrence of failure due to the shift lock release button since the shift lock release button and structure are removed from the system. In addition, it is possible to manage and manufacture the specification to which the shift lock release button is applied and the specification to which the shift lock release button is not applied in an integrated manner other than separately manufacturing them, thereby reducing investment and material costs. It is possible to increase marketable quality by an improvement in aesthetics of the console equipped with the shift lever.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF ILLUSTRATIVE EMBODIMENTS

A system for neutral range parking of a vehicle and a method of controlling the same according to the preferred embodiments of the present invention will be described below with reference to the accompanying drawings.

Figure 1:
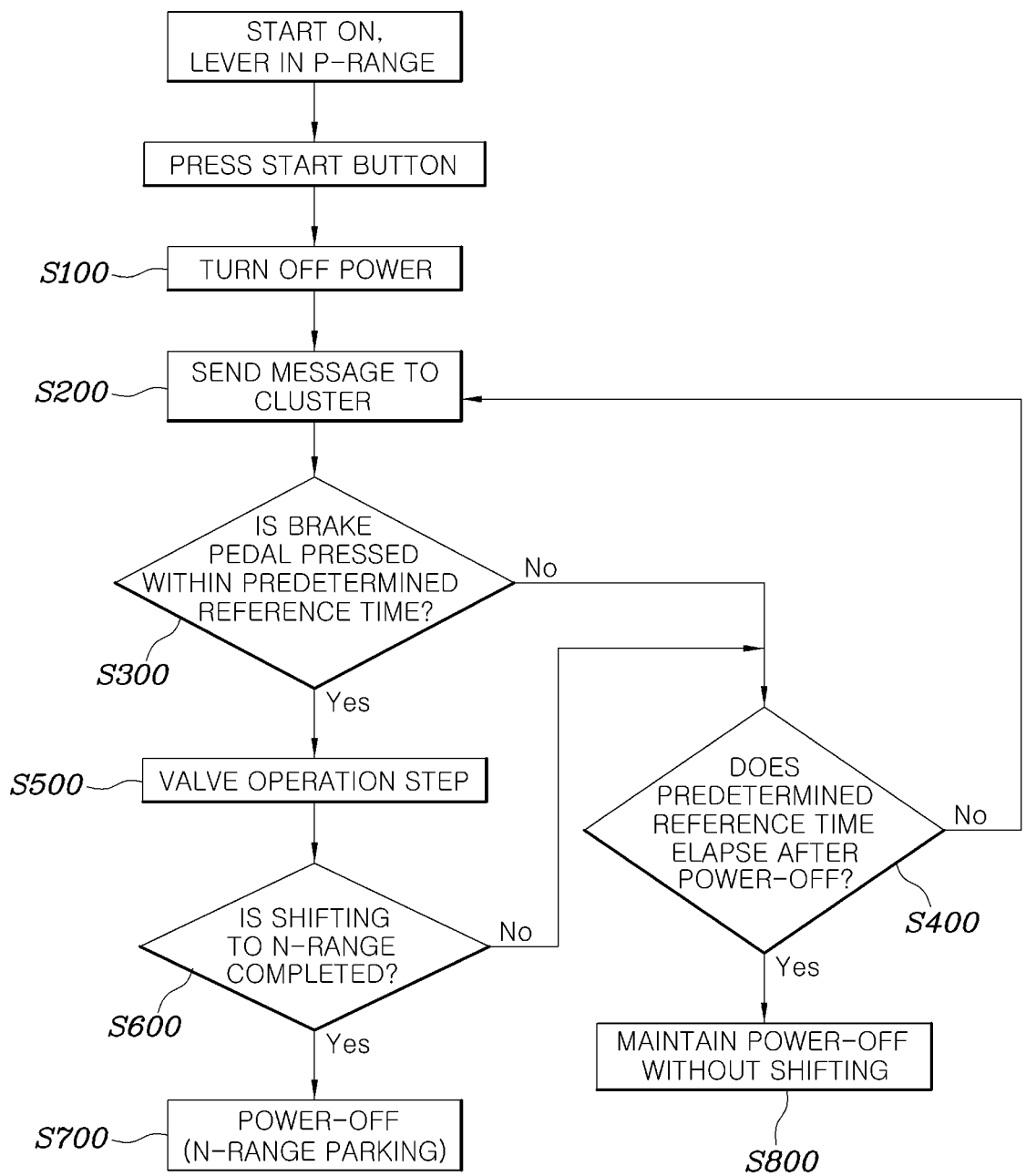
FIG. 1 is a flowchart illustrating a method of controlling a system for neutral range parking of a vehicle according to an embodiment of the present invention.
Figure 2:
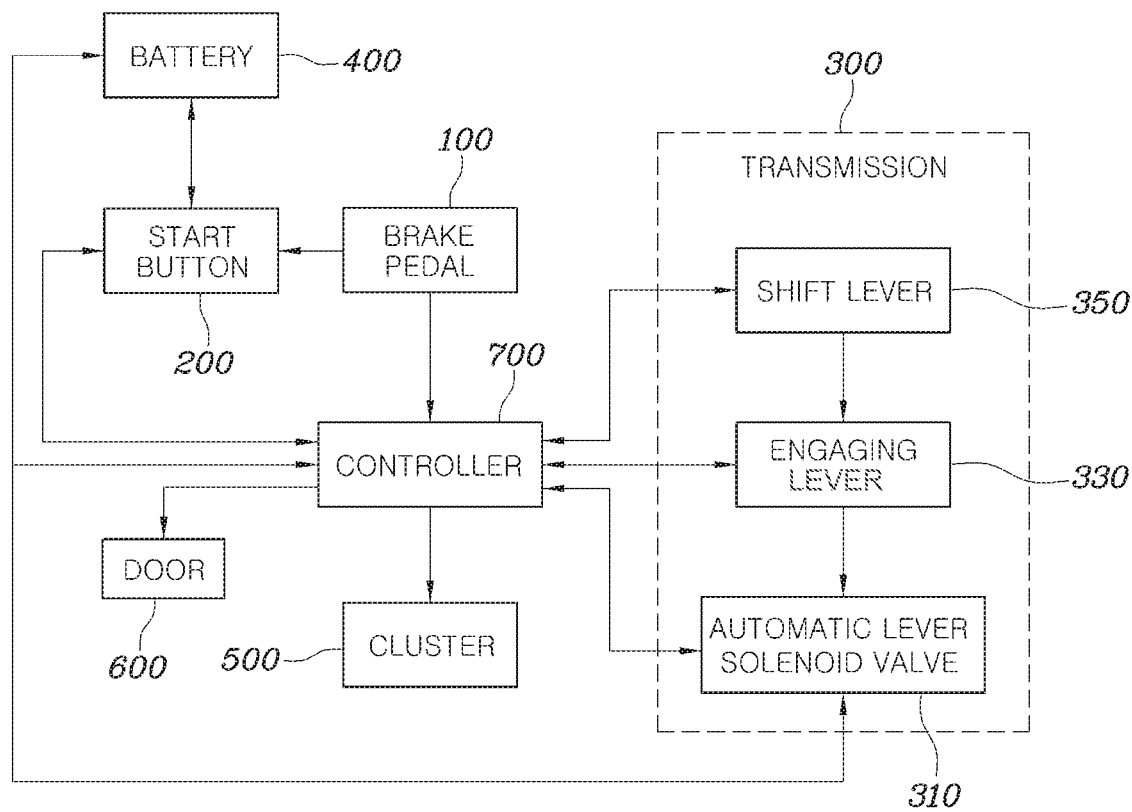
FIG. 2 is a block diagram briefly illustrating a system for neutral range parking of a vehicle according to an embodiment of the present invention for performing the method of FIG. 1.

FIG. 1 is a flowchart illustrating a method of controlling a system for neutral range parking of a vehicle according to an embodiment of the present invention. FIG. 2 is a block diagram briefly illustrating a system for neutral range parking of a vehicle according to an embodiment of the present invention for performing the method of FIG. 1.

In the system for neutral range parking of a vehicle and the method of controlling the same according to the embodiments of the present invention, the system of FIG. 2 is provided to perform the method of FIG. 1.

First, the system for neutral range parking of a vehicle according to the embodiment of the present invention is a system used to perform the method of controlling a system for neutral range parking of a vehicle, and includes a battery 400 that supplies power to a vehicle, a start button 200 that is connected to the battery 400 to turn on/off the engine of the vehicle, a brake pedal 100 that is provided for deceleration or stop of the vehicle, a transmission 300 that shifts gears by the operation of a shift lever 350, an automatic lever solenoid valve 310 that is electrically connected to the B+ terminal of the battery 400 while being installed in the transmission 300 and is operated, when the brake pedal 100 is operated in a power-off state, so as to allow for shifting to a shift range other than a P-range by releasing the engagement with an engaging lever 330 (also referred to as an engaging valve), and a controller 700 that controls the battery 400, the start button 200, the brake pedal 100, the transmission 300, and the automatic lever solenoid valve 310. In addition, the vehicle is equipped therein with a cluster 500 for sending a message such as a warning or an alarm to a user. Therefore, in the present invention, the controller 700 sends a message saying "Please operate brake pedal if you want to shift from P-range to another shift range" or the like to the cluster 500 when the power of the vehicle is turned off. Here, the controller 700 may include a body control module (BCM), a transmission control unit (TCU), an electronic control unit (ECU), etc. In addition, the message sent from the controller 700 to the cluster 500 is not limited thereto, and it may be various changed depending on environment or design.

The power of the vehicle typically consists of four steps: Power OFF, Power ACC (accessory), IG (ignition) ON (=Power ON), and Start ON. Conventionally, the automatic lever solenoid valve 310 of the transmission 300 is electrically connected to the ignition 1 of the power circuit. Hence, the automatic lever solenoid valve 310 is not operated since power is not applied thereto even though the brake pedal 100 is operated when the start button 200 is turned off. However, in the present invention, the automatic lever solenoid valve 310 is electrically connected to the B+ terminal instead of the ignition 1 of the power circuit. Therefore, the automatic lever solenoid valve 310 may be maintained in a power-on state for a predetermined reference time pre-input to the controller 700 even though the engine of the vehicle is turned off. Accordingly, the present invention enables the shift lever to shift to an N-range just by simple operation in the state in which the vehicle is parked in the P-range without using a separate shift lock release button (not shown). This control method will be described later.

In addition, the shifting from "P-range" to "another shift range" is described herein. However, since the present invention is aimed at shifting from the P-range to the N-range for double parking, the above "another shift range" will preferably be an "N-range" unless otherwise specified herein.

The method of controlling a system for neutral range parking of a vehicle according to the embodiment of the present invention will be described in detail with reference to the drawings. As illustrated in FIGS. 1 and 2, the method of controlling a system for neutral range parking of a vehicle according to the embodiment of the present invention includes a power-off step S100 of turning off power by operating a start button 200 in a state in which the shift range of a vehicle transmission 300 is a P-range, a pedal operation determination step S300 of determining whether a brake pedal 100 is operated by a controller 700 after the power is turned off in the power-off step S100, and a valve operation step S500 of operating an automatic lever solenoid valve 310 of the transmission 300 by the controller 700 when the brake pedal 100 is determined to be operated in the pedal operation determination step S300, so as to allow the transmission 300 to shift from the P-range to another shift range by releasing the engagement between the automatic lever solenoid valve 310 and an engaging lever 330 performed when the shift range is changed to the P-range in the power-off step S100.

When there is a need for double parking, the user first sets the shift range of the transmission 300 to be the P-range and operates the start button 200 to turn off power for parking the vehicle. The controller 700 determines that the power-off step S100 is performed in this state, and begins control for N-range parking. When the power is turned off in the power-off step S100, the controller 700 performs a message sending step S200 of sending a message similar to "Please operate brake pedal if you want to shift from P-range to another shift range" to a cluster 500. In more detail, it is possible to send the message for encouraging the user to operate the brake pedal 100 when you want to shift from the P-range to the N-range, namely to present a predetermined reference time pre-input to the controller 700 and send the message for encouraging the user to operate the brake pedal 100 within the predetermined reference time. Therefore, it is possible to send a message saying "Please change shift lever to N-range in the state of pressing brake pedal within 30 seconds if you want to park in N-range", for example.

Accordingly, when the user checks this message sent to the cluster 500 and needs to park in the N-range, the user will press the brake pedal 100 and operate the shift lever 350. On the other hand, when there is no need for parking in the N-range, the user won't operate the brake pedal 100 and the shift lever 350.

Therefore, the controller 700 performs the pedal operation determination step S300 of determining whether the brake pedal 100 is operated after the message sending step S200. When the brake pedal 100 is checked to be operated within the predetermined reference time pre-input to the controller 700 in the pedal operation determination step S300, the controller 700 operates the automatic lever solenoid valve 310 of the transmission 300. The shift range of the transmission 300 is changed to the P-range before the power is turned off in the power-off step S100. In this state, the transmission 300 is prevented from shifting from the P-range to another shift range since the engaging lever 330 operated along with the operation of the shift lever 350 is engaged with the operating rod (not shown) of the automatic lever solenoid valve 310 in the transmission 300. Therefore, when the brake pedal 100 is determined to be operated in the pedal operation determination step S300, the controller 700 performs the valve operation step S500 of operating the automatic lever solenoid valve 310 to allow the transmission 300 to shift from the P-range to another shift range by releasing the engagement between the automatic lever solenoid valve 310 and the engaging lever 330.

However, when the signal indicative of the operation of the brake pedal 100 is not input to the controller 700 in the pedal operation determination step S300, the controller 700 further performs an elapsed time determination step S400 of determining whether an elapsed time after the power is turned off in the power-off step S100 exceeds the predetermined reference time pre-input to the controller 700. If the elapsed time after the power is turned off in the power-off step S100 is determined to exceed the predetermined reference time pre-input to the controller 700 in the elapsed time determination step S400, the controller 700 determines that there is no need for gear-shifting any more since the user does not need to park in the N-range. Thus, the controller 700 performs a power-off retention step S800 of maintaining the power-off state and terminating the control so as not to perform the gear-shifting any more.

However, when it is determined that the elapsed time after the power is turned off in the power-off step S100 does not exceed the predetermined reference time pre-input to the controller 700 in the elapsed time determination step S400, the controller 700 repeatedly performs the message sending step S200 of sending the message saying "Please operate brake pedal if you want to shift from P-range to another shift range" or the like to the cluster 500.

In addition, when the signal indicative of the operation of the brake pedal 100 is input to the controller 700 in the pedal operation determination step S300, the controller 700 performs the valve operation step S500 of operating the automatic lever solenoid valve 310 to allow the transmission 300 to shift from the P-range to another shift range by releasing the engagement between the automatic lever solenoid valve 310 and the engaging lever 330. Then, the controller 700 further performs a shift completion determination step S600 of determining whether the shifting from the P-range to another shift range, namely the N-range, is performed in order to determine whether the shifting is substantially performed.

If it is determined that the shifting from the P-range to another shift range is not performed in the shift completion determination step S600, the controller 700 repeatedly performs the elapsed time determination step S400 of determining whether the elapsed time after the power is turned off in the power-off step S100 exceeds the predetermined reference time pre-input to the controller 700. On the other hand, when the elapsed time after the power is turned off in the power-off step S100 is determined to exceed the predetermined reference time pre-input to the controller 700 in the elapsed time determination step S400, the controller 700 determines that there is no need for gear-shifting any more since the user does not need to park in the N-range. Thus, the controller 700 performs the power-off retention step S800 of maintaining the power-off state and terminating the control so as not to perform the gear-shifting any more. However, when it is determined that the elapsed time after the power is turned off in the power-off step S100 does not exceed the predetermined reference time pre-input to the controller 700 in the elapsed time determination step S400, the controller 700 repeatedly performs the message sending step S200 of sending the message saying "Please operate brake pedal if you want to shift from P-range to another shift range" or the like to the cluster 500.

On the other hand, when the shifting from the P-range to another shift range, namely the N-range, is completely performed in the shift completion determination step S600, the controller 700 turns off the power and terminates the controls to realize parking in the N-range (S700).

In the method of controlling a system for neutral range parking of a vehicle according to the embodiment of the present invention, the controller 700 controls the shift range to shift only to the N-range in shifting from the P-range to another shift range by the operation of the automatic lever solenoid valve 310 in the valve operation step S500. Accordingly, it is possible to increase user's safety by preventing the vehicle from traveling when the user releases the pressed brake pedal 100 due to shifting to a drivable shift range such as a D-range or an R-range in the incognizance state of the user.

In addition, the controller 700 controls the door 600 to be lockable even when the shifting is performed from the P-range to the N-range as another shift range in the valve operation step S500, thereby preventing the unlocking of the door 600 in the shift range other than the P-range in the related art.

Through the control method in the present invention, the Parking in the N-range is possible since the automatic lever solenoid valve 310 is electrically connected to the B+ terminal of the battery 400. Thus, the controller 700 may maintain the power-on state for the time determining whether the signal indicative of the operation of the brake pedal 100 is input to the controller 700 within the predetermined reference time pre-input to the controller 700 even after the power is turned off in the power-off step S100, thereby performing the pedal operation determination step S300.

Accordingly, in accordance with the system for neutral range parking of a vehicle having the above-mentioned structure and the method of controlling the same, it is possible to reduce the cost, weight, and size of the system, increase the degree of freedom of layout, improve workability in the assembly process, and prevent the occurrence of failure due to the shift lock release button since the shift lock release button and structure are removed from the system. In addition, it is possible to manage and manufacture the specification to which the shift lock release button is applied and the specification to which the shift lock release button is not applied in an integrated manner other than separately manufacturing them, thereby reducing investment and material costs. It is possible to increase marketable quality by an improvement in aesthetics of the console equipped with the shift lever.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling a system for neutral range parking of a vehicle, the method comprising:
   turning off power of the vehicle based on operation of a start button when a shift range of a vehicle transmission is a P-range;
   determining whether a brake pedal is operated after the power is turned off; and
   when the brake pedal is determined to be operated after the power is turned off, operating an automatic lever solenoid valve of the transmission to allow the transmission to shift from the P-range to another shift range by releasing engagement between the automatic lever solenoid valve and an engaging lever;
   determining whether a time elapsed after the power is turned off exceeds a predetermined reference time; and
   when the time elapsed after the power is turned off is determined to exceed the predetermined reference time, maintaining a power-off state so as not to perform gear-shifting anymore.

2. The method according to claim 1, wherein a controller determines whether the brake pedal is operated after the power is turned off and wherein the automatic lever solenoid valve of the transmission is operated under control of the controller.

3. The method according to claim 2, wherein the controller determines whether a signal indicative of the operation of the brake pedal is input to the controller within a predetermined reference time.

4. The method according to claim 2, wherein the predetermined reference time is pre-input to the controller, and wherein the controller maintains the power-off state so as not to perform gear-shifting anymore.

5. The method according to claim 2, further comprising determining whether the shifting from the P-range to another shift range is completely performed by the controller by operating the automatic lever solenoid valve of the transmission, when a signal indicative of the operation of the brake pedal is input to the controller in the determining whether the brake pedal is operated.

6. The method according to claim 5, wherein the controller turns off the power and terminates control when the controller determined that the shifting from the P-range to another shift range is completed.

7. The method according to claim 2, wherein the controller controls the shift range to shift only to an N-range in shifting from the P-range to another shift range by the operation of the automatic lever solenoid valve in the operating the automatic lever solenoid valve.

8. The method according to claim 2, wherein the controller controls a door to be lockable even when the shifting from the P-range to another shift range is performed in the operating the automatic lever solenoid valve.

9. The method according to claim 1, wherein determining whether the brake pedal is operated after the power is turned off is stopped after the predetermined reference time.

10. The method according to claim 9, further comprising sending a message indicating that the brake pedal can be operated from the P-range to another shift range when the controller determined that the time elapsed after the power is turned off does not exceed the predetermined reference time.

11. The method according to claim 1, further comprising sending a message indicating that the brake pedal can be operated from the P-range to another shift range, the message being sent when the power is turned off.

12. The method according to claim 11, wherein the message indicates that a driver should operate the brake pedal to shift from the P-range to another shift range.

13. The method according to claim 1, wherein operating the automatic lever solenoid valve of the transmission to allow the transmission to shift from the P-range to another shift range comprises allowing the transmission to shift from the P-range to an N-range.

14. The method according to claim 1, wherein the automatic lever solenoid valve is electrically connected to a B+ terminal of a battery and wherein operating the automatic lever solenoid valve of the transmission comprises determining whether a signal indicative of the operation of the brake pedal is active within a predetermined reference time after the power is turned off in the turning off power and then operating the automatic lever solenoid valve of the transmission allowing the transmission to shift from the P-range to another shift range.

15. A method of controlling a system for neutral range parking of a vehicle, the method comprising:
   turning off power of the vehicle based on operation of a start button when a shift range of a vehicle transmission is a P-range;
   determining whether a brake pedal is operated after the power is turned off;
   when the brake pedal is determined to be operated after the power is turned off, operating an automatic lever solenoid valve of the transmission to allow the transmission to shift from the P-range to another shift range by releasing engagement between the automatic lever solenoid valve and an engaging lever;
   determining whether the shifting from the P-range to another shift range is completely performed by operating the automatic lever solenoid valve of the transmission based on a signal indicative of the operation of the brake pedal;
   when determining that shifting from the P-range to another shift range is not completely performed, determining whether an elapsed time after the power is turned off in the turning off power exceeds a predetermined reference time.

16. The method according to claim 15, wherein a controller maintains a power-off state so as not to perform gear-shifting any more when the elapsed time after the power is turned off is determined to exceed the predetermined reference time.

17. The method according to claim 15, further comprising sending a message indicating that the brake pedal can be operated from the P-range to another shift range when it is determined that the elapsed time after the power is turned off does not exceed the predetermined reference time.

18. A vehicle comprising:
   a battery configured to supply power;
   a start button connected to the battery;
   a brake pedal;
   a transmission configured to shift gears by operation of a shift lever;
   an automatic lever solenoid valve electrically connected to a B+ terminal of the battery; and
   a controller configured to:
      turn off power of the vehicle based on operation of the start button when a shift range of the transmission is a P-range;
      determine whether the brake pedal is operated after the power is turned off;
      when the brake pedal is determined to be operated after the power is turned off, operate the automatic lever solenoid valve to allow the transmission to shift from the P-range to another shift range by releasing engagement between the automatic lever solenoid valve and an engaging lever;
      determine whether a time elapsed after the power is turned off exceeds a predetermined reference time; and
      when the time elapsed after the power is turned off is determined to exceed the predetermined reference time, maintain a power-off state so that gear-shifting cannot be performed anymore.

19. The vehicle according to claim 18, further comprising an engine, wherein the start button is connected to the battery to turn on/off the engine.

20. The vehicle according to claim 18, wherein the controller is configured to send a message indicating that the brake pedal can be operated from the P-range to another shift range, the message being sent when the power is turned off.

* * * * *